Dec. 23, 1930.  V. BENDIX ET AL  1,785,854

BRAKE OPERATING MECHANISM

Filed July 12, 1928

INVENTOR
DAVID L. GALLUP
VINCENT BENDIX

BY

*Jn. W. McConkey*

ATTORNEY

Patented Dec. 23, 1930

1,785,854

UNITED STATES PATENT OFFICE

VINCENT BENDIX, OF CHICAGO, ILLINOIS, AND DAVID L. GALLUP, OF SOUTH BEND, INDIANA, ASSIGNORS TO BENDIX BRAKE COMPANY, OF CHICAGO, ILLINOIS, A CORPORATION OF ILLINOIS

BRAKE-OPERATING MECHANISM

Application filed July 12, 1928. Serial No. 292,152.

This invention relates to brakes, and is illustrated as embodied in novel operating means for an internal expanding front-wheel automobile brake of the pivoted-shoe type.

An object of the invention is to provide an inexpensive but effective device for operating the brake, preferably by wedging the shoes apart against the drum. In one desirable arrangement this device includes a novel laminated wedge, shown as operated by a thrust rod having a ball-and-socket connection with the center lamination, and preferably including a central spacer plate or stamping projecting beyond the side stampings to seat between the rollers on the ends of the shoes to hold the wedge and the shoe ends in operative alinement. The side plates or stampings have wedge surfaces on their edges for direct engagement with the rollers.

Other features of the invention relate to desirable details of construction of the above-described wedge, and to other novel and improved structural details which will be apparent from the following description of the illustrative embodiment shown in the accompanying drawing, in which.

Figure 2:
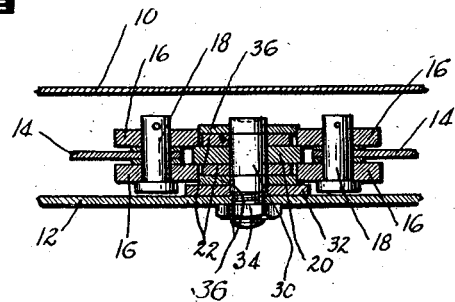
Figure 2 is a partial section through the brake on the line 2—2 of Figure 1, showing the structure of the wedge and its relation to the rollers.

The illustrated brake includes a rotatable drum 10, at the open side of which is a support such as a backing plate 12, and within which are shoes 14 or equivalent friction devices having adjacent ends adapted to be forced apart to apply the brake. The illustrated shoes are T-shaped in cross-section, having central stiffening webs provided at the lower ends of the shoes with pairs of thrust rollers 16 on opposite sides of the shoes, and which may be mounted on pivots 18 extending transversely through the webs. The rollers 16, as will be apparent from Figure 2, project beyond the ends of the shoe webs.

Figure 1:
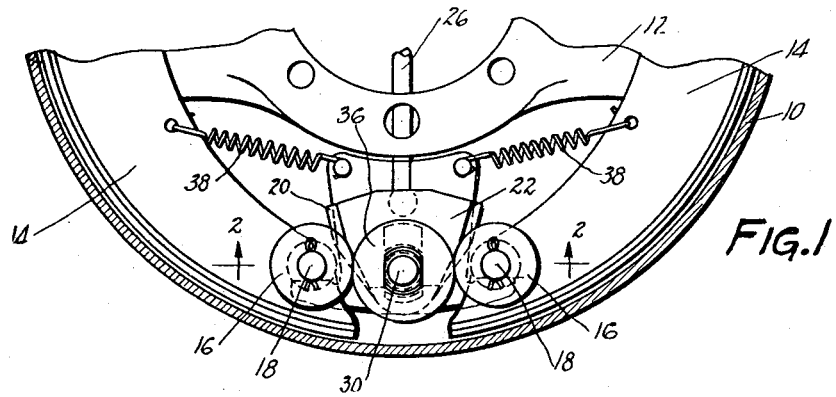
Figure 1 is a vertical section through the lower part of the brake, just inside the head of the brake drum, and showing the unanchored ends of the shoes in side elevation.
Figure 3:
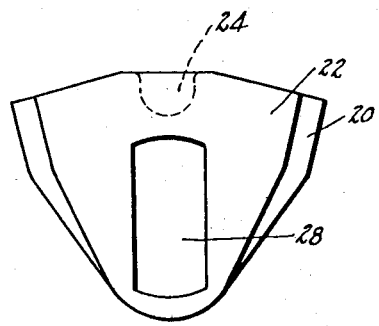
Figures 3 and 4 are elevations of the wedge, taken 90° apart.
Figure 4:
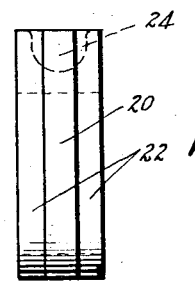

The novel laminated operating wedge includes a central spacer plate or stamping 20, and two separately-formed side members or stampings 22 spot-welded or otherwise permanently secured to the opposite sides of the spacer plate 20. Plate 20 projects beyond members 22 to seat between the rollers 16 on each of the shoes 14, thus holding the wedge and the shoe ends in operative alinement. The spacer plate is cut out on its upper edge to form the major part of a socket 24, the sides of which may be formed if desired by cutting into members 22 as shown in Figure 4, and which socket receives a ball on the lower end of a vertically-movable operating thrust rod 26, which in the case of a front brake moves lengthwise along the swiveling axis of the wheel in applying the brake. This forms a ball-and-socket joint between the wedge and the thrust rod 26.

The three stampings may be formed with alined vertically-elongated openings 28 slidably embracing a guide such as a pin 30 threaded through the backing plate 12 and a reinforcing plate 32 and held, if desired, by a lock-nut 34. Washers 36 may be sleeved on guide 30 on opposite sides of the wedge.

Suitable return springs 38 may be provided for shoes 14.

Figure 5:
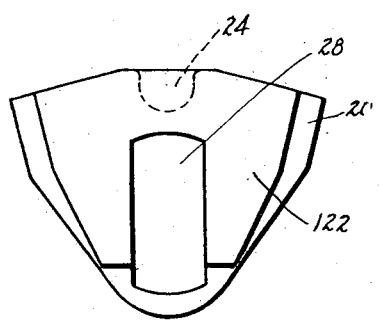
Figures 5 and 6 are similar elevations of a modified form of wedge.
Figure 6:
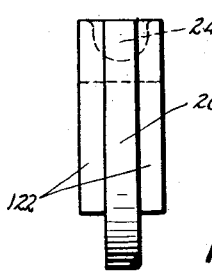

As shown in Figures 5 and 6, to facilitate the formation of the two side wedge members or stampings, they may be formed as plates 122 corresponding to plates 22, except cut away at the narrow end of the wedge, short of the lower end of the opening 28.

While two illustrative embodiments have been described in detail, it is not our intention to limit the scope of the invention to those particular embodiments, or otherwise than by the terms of the appended claims.

We claim:

1. A brake comprising, in combination with shoes having adjacent ends each provided with a pair of rollers on its opposite sides, a laminated operating wedge including a central stamping extending between the rollers of each of said ends and holding the shoe ends and the wedge in operative alinement, and side stampings permanently secured to opposite sides of the central stamping and formed on their edges with wedge surfaces engaging the four rollers, together with a thrust rod having a ball-and-socket engagement with said central stamping.

2. A brake comprising, in combination with shoes having adjacent ends each provided with a pair of rollers on its opposite sides, a laminated operating wedge including a central spacer plate extending between the rollers of each of said ends and holding the shoe ends and the wedge in operative alinement, and separately-formed side members permanently secured to opposite sides of the central spacer plate and formed on their edges with wedge surfaces engaging the four rollers, together with a thrust rod having a ball-and-socket engagement with said central spacer plate.

3. A brake-operating wedge including at least three stampings permanently secured together, and with the central stamping projecting beyond the other stampings and with said other stampings formed with wedge surfaces on their edges, together with a thrust rod having a ball-and-socket connection with the central stamping.

4. A brake-operating wedge including a plurality of stampings permanently secured together, and formed with wedge surfaces on their side edges, together with a thrust rod having a ball-and-socket connection with the central stamping.

5. A brake-operating wedge including at least three stampings permanently secured together and formed with alined elongated openings for engagement with a guide.

6. A brake-operating wedge including at least three stampings permanently secured together and formed with alined elongated openings for engagement with a guide, the two side stampings being cut away at the narrow end of the wedge short of the end of the opening in the central stamping.

7. A brake comprising, in combination with shoes having adjacent ends each provided with a pair of rollers on its opposite sides, a laminated wedge including at least three stampings permanently secured together and with a central stamping projecting beyond the other stampings and extending between the rollers of each of said ends, said wedge provided with aligned elongated openings for engagement with a guide, together with a thrust rod having a ball and socket connection with the central stamping.

In testimony whereof, we have hereunto signed our names.

VINCENT BENDIX.
DAVID L. GALLUP.